(12) United States Patent
Siebers et al.

(10) Patent No.: US 8,053,381 B2
(45) Date of Patent: *Nov. 8, 2011

(54) OPTICALLY DETECTABLE, FLOATABLE ARSENIC- AND ANTIMONY-FREE, GLAZABLE LITHIUM-ALUMINOSILICATE GLASS

(75) Inventors: Friedrich Siebers, Nierstein (DE); Hans-Werner Beudt, Wiesbaden (DE); Bernd Rüdinger, Wörrstadt (DE); Gerbard Lautenschläger, Jena (DE); Klaus Schneider, Apolda (DE); Michael Jacquorie, Rheinböllen (DE); Wolfgang Schmidbauer, Mainz-Finthen (DE)

(73) Assignee: Schott AG, Mainz (DE)

( * ) Notice: Subject to any disclaimer, the term of this patent is extended or adjusted under 35 U.S.C. 154(b) by 109 days.

This patent is subject to a terminal disclaimer.

(21) Appl. No.: 12/393,753

(22) Filed: Feb. 26, 2009

(65) Prior Publication Data

US 2009/0286667 A1 Nov. 19, 2009

Related U.S. Application Data

(62) Division of application No. 11/688,108, filed on Mar. 19, 2007, now abandoned.

(30) Foreign Application Priority Data

Mar. 20, 2006 (EP) .................................... 06005594

(51) Int. Cl.
*C03C 10/14* (2006.01)
*C03C 10/12* (2006.01)

(52) U.S. Cl. .................................. 501/4; 501/7; 65/33.8

(58) Field of Classification Search .................. 501/4, 7; 65/33.8

See application file for complete search history.

(56) References Cited

U.S. PATENT DOCUMENTS

| | | |
|---|---|---|
| 4,018,612 A | 4/1977 | Chyung et al. |
| 4,093,468 A | 6/1978 | Boitel et al. |
| 6,914,223 B2 | 7/2005 | Krause et al. |
| 7,141,521 B2 | 11/2006 | Siebers et al. |
| 2002/0018575 A1 | 2/2002 | Bream |
| 2002/0023463 A1 | 2/2002 | Siebers et al. |
| 2002/0058117 A1 | 5/2002 | Schultheis et al. |
| 2003/0019864 A1 | 1/2003 | Krause et al. |
| 2005/0143246 A1 | 6/2005 | Comte et al. |
| 2005/0250639 A1 | 11/2005 | Siebers |
| 2007/0232476 A1* | 10/2007 | Siebers et al. ............ 501/4 |
| 2010/0099546 A1* | 4/2010 | Aitken et al. ............. 501/4 |
| 2010/0130342 A1* | 5/2010 | Siebers et al. ............ 501/7 |

FOREIGN PATENT DOCUMENTS

| | | |
|---|---|---|
| DE | 100 17 701 A1 | 10/2001 |
| FR | 2 405 906 A | 5/1979 |
| GB | 1070124 A | 5/1967 |
| GB | 1 562 332 A | 3/1980 |
| WO | WO 01/72086 A | 9/2001 |
| WO | WO-01 72087 | 9/2001 |

* cited by examiner

*Primary Examiner* — Karl Group
(74) *Attorney, Agent, or Firm* — Millen, White, Zelano & Branigan, P.C.

(57) ABSTRACT

An optically detectable, floatable arsenic- and antimony-free, glazable lithium-aluminosilicate glass that can be prestressed and the glass ceramic converted therefrom are described. The glass or the glass ceramic has a composition (in % by weight based on oxide) of essentially $SiO_2$ 55-69, $Al_2O_3$ 19-25, $Li_2O$ 3.2-5, $Na_2O$ 0-1.5, $K_2O$ 0-1.5, MgO 0-2.2, CaO 0-2.0, SrO 0-2.0, BaO 0-2.5, ZnO 0-<1.5, $TiO_2$ 1-3, $ZrO_2$ 1-2.5, $SnO_2$ 0.1-<1, $\Sigma TiO_2+ZrO_2+SnO_2$ 2.5-5, $P_2O_5$ 0-3, $Nd_2O_3$ 0.01-0.6, CoO 0-0.005, F 0-1, $B_2O_3$ 0-2.

9 Claims, 2 Drawing Sheets

FIG. 1

Transmission Spectrum of Glasses of Example 1 (Comparison Glass) and Example 2 (4 mm of Thickness)

FIG. 2

Transmission Spectrum of Glass Ceramics, Example 10 (Comparison Glass Ceramic) and Example 11 (4 mm Thickness)

OPTICALLY DETECTABLE, FLOATABLE ARSENIC- AND ANTIMONY-FREE, GLAZABLE LITHIUM-ALUMINOSILICATE GLASS

This application is a divisional application of Ser. No. 11/688,108, filed Mar. 19, 2007, now abandoned which is incorporated by reference.

The invention relates to an optically detectable, floatable arsenic- and antimony-free, glazable lithium-aluminum silicate glass that can be prestressed and the glass ceramic that is converted therefrom.

Because of their excellent thermal properties, panes made of glass ceramic or their precursor glass have multiple uses, i.a., for stove tops, oven doors, fireplace doors and for fire protection glazing. For many applications of glasses, the panes are prestressed thermally or chemically for the purpose of increasing the strength as safety glasses or for operator protection.

To achieve a high optical quality, these glasses are produced according to the float process. Transparent panes then can virtually no longer be distinguished visually from window glass (lime-sodium glass). Also, the floating allows the production of flat glasses with larger dimensions than other shaping processes, since during floating, band widths of over 2 m to about 5 m are common. Such a glass is described in, e.g., DE 100 17 01 C2 and the corresponding U.S. Pat. No. 6,846,760 B2.

If such glasses or glass ceramics are recycled together with normal flat glass, in the glassworks that produce common sodium-lime glass, a large proportion of the problems that they experience are associated with the cullets that are delivered to them, since glass ceramics and their precursor glasses dissolve only very slowly in the melting conditions that prevail in the sodium-lime melting tanks and, when they accumulate in large amounts, impair the function of the melting tank and the shaping.

Glass ceramics and their precursor glasses, which are to be produced according to the float process, have to be refined free of arsenic and antimony. Under the effect of the reducing conditions during floating, namely the above-mentioned refining agents are reduced right on the glass surface and form disruptive and visually obvious metallic deposits. The removal of the latter for the application of disruptive and toxicologically harmful deposits by grinding and polishing is disadvantageous for economic reasons. In addition, the use of $As_2O_3$ and $Sb_2O_3$ is also disadvantageous from safety and environmental aspects, since in the recovery of raw materials and preparation and because of the evaporation in the melt, as well as in post-processing processes and in recycling and dumping of waste, special precautionary measures must be taken.

In addition to the very expensive underpressure refining by purely physical means, the arsenic- and antimony-free refining is usually carried out chemically and preferably with use of tin compounds. This tin refining has the drawback, however, that in particular in glazing, a disruptive SnTi color complex occurs, which absorbs in the short- to middle-wave portion of the visible light. This color complex causes disruption in the floated starting glass only in the case of high quality requirements, but it considerably intensifies during glazing and results in a clearly observable yellow-brown coloring.

For economic and environmental-protection political reasons, increasing importance will be given to glass recycling in the future. To ensure as economical recycling of old cullets as possible, optical processes that separate the cullets based on their different absorption bands are increasingly used. In this case, e.g., the cullets are transported in an assembly line through a light barrier, whereby the light wave frequency that is emitted or absorbed by the respective cullet is detected, and the cullet is blown in general pneumatically, depending on the detected frequency, into the corresponding collecting tank.

The object of the invention consists in further developing a glass ceramic or its precursor glass, which are in the composition range of the above-mentioned DE 100 177 01 C2 or U.S. Pat. No. 6,846,760, such that they can be detected in a cullet sorting unit by optical processes, and the yellow-brown coloring that is based on the formation of the Sn/Ti complex can be reduced or completely suppressed.

This object is achieved by the glass or the glass ceramic described in claim 1.

The optically detectable, floatable arsenic- and antimony-free, glazable glass according to the invention that can be prestressed and the glass ceramic converted therefrom have a composition (in % by weight based on oxide) of

| | |
|---|---|
| $SiO_2$ | 55-69 |
| $Al_2O_3$ | 19-25 |
| $Li_2O$ | 3.2-5 |
| $Na_2O$ | 0-1.5 |
| $K_2O$ | 0-1.5 |
| MgO | 0-2.2 |
| CaO | 2.0 |
| SrO | 2.0 |
| BaO | 0-2.5 |
| ZnO | 0-<1.5 |
| $TiO_2$ | 1-3 |
| $ZrO_2$ | 1-2.5 |
| $SnO_2$ | 0.1-<1 |
| $\Sigma\, TiO_2 + ZrO_2 + SnO_2$ | 2.5-5 |
| $P_2O_5$ | 0-3 |
| $Nd_2O_3$ | 0.01-0.6 |
| CoO | 0-0.005 |
| F | 0-1 |
| $B_2O_3$ | 0-2 |

In the case of floated, prestressable glass ceramic according to the invention or in the case of flat glass that can be converted into a transparent, colorless glass ceramic with high-quartz mixed crystals or keatite-mixed crystals as a main-crystal phase, the disruptive inherent color that is based on Sn/Ti color complexes is reduced by additions of compounds of Nd in contents of 100 to 6,000 ppm. In this information, the Nd content is converted into an oxide base ($Nd_2O_3$), whereby the type of Nd additive in the batch is not limited to the indicated oxide, but rather any Nd compounds can be added.

Studies have shown that the Nd behaves to a large extent inertly as a labeling and staining agent in the float process. The selection of Nd is advantageous, since the Nd with its stable valence as a trivalent ion cannot be reduced by the reducing action of the float atmosphere that consists of forming gas or liquid Sn. Such a reduction is usually associated with surface defects during floating.

Additions of CO in a total amount of up to 50 ppm (converted to CoO) to the Nd additive are advantageously to set the color point of the floated flat glass or the transparent glass ceramic produced therefrom more precisely in the direction of the achromatic point. The Nd additive by itself does not exactly shift the color point in the direction of the achromatic point, so that this slight correction may be advantageous. In these low contents, the above-mentioned additives have proven to be non-disruptive in the float process. In addition to CO, other staining agents, such as e.g., Ni, V, Cr, Mn, Cu, Ce, Se or rare earth ions, can also be used in addition in small contents to set the color shade.

The additions of Nd have the advantage that this element in addition also readily counteracts the coloring by Fe/Ti complexes, as known in the art from U.S. Pat. No. 4,093,468, which produce a similar color to the Sn/Ti complex.

The color point that is measured in the CIE color system or in the lab color system is shifted by Nd quite well in the direction of the achromatic point. In addition, the Nd as a coloring ion from the 4f group of the periodic table has a great number of characteristic absorption bands that make possible a clear labeling. In the conversion of the floated flat glass into the transparent glass ceramic, these absorption lines are changed only slightly, while the absorption bands, e.g., the Co and Ni, are noticeably changed. This is substantiated in that the coloring ions of the 3d-element group of the periodic table with their absorption bands are influenced more greatly by the crystal field environment. The change in the crystal field environment takes place in the glazing in that Co and Ni are incorporated in the high-quartz mixed crystal.

The oxides $Li_2O$, $Al_2O_3$ and $SiO_2$ are necessary components within the indicated limits for the chemical prestressability of the floated flat glass and for the conversion into the glass ceramics with high-quartz and/or keatite-mixed crystal phases. $Li_2O$ contents of over 5% by weight result in an accidental devitrification in the production process. As additional components, MgO, ZnO and $P_2O_5$ can be incorporated in the crystal phases. The ZnO content is limited because of the problem of forming glass defects during floating. The MgO content is limited to a maximum of 2.2% by weight, preferably to 0.1 to 2.0% by weight, since otherwise it unacceptably increases the expansion coefficients of the glass ceramic. To avoid high viscosities of the glass and the tendency toward undesirable crystallization of mullite, the $Al_2O_3$ content is limited to a maximum of 25% by weight, preferably 24% by weight. The $SiO_2$ content is to be at most 69% by weight, preferably 68% by weight, since this component greatly increases the viscosity of the glass. Thus, for the melting down of glasses and with respect to the temperature stress of the float part in the shaping, higher contents of $SiO_2$ are disadvantageous. The addition of the alkalis $Na_2O$, $K_2O$, the alkaline-earths CaO, SrO, BaO, as well as F and $B_2O_3$ improves the meltability and the devitrification behavior of the glass during floating. The contents are limited, however, since these components essentially remain in the glass ceramic residual glass phase, and increase the thermal expansion in an unacceptable way, by which the temperature resistance of the glass ceramic deteriorates. Also, higher contents can adversely affect the crystallization behavior in the conversion of the floated flat glass into the glass ceramic. The sum of the alkalis $Na_2O+K_2O$ is preferably to be 0.1 to 2% by weight, preferably 0.2 to 2% by weight, in particular 0.4 to 1.5% by weight. The addition of $P_2O_5$ can be up to 3% by weight and is preferably limited to 2% by weight. The addition of $P_2O_5$ is advantageous for the devitrification resistance during floating, but higher contents have a disadvantageous effect on the acid resistance. The contents of the nucleating components $TiO_2$, $ZrO_2$, and $SnO_2$ can be controlled within relatively narrow limits. On one side, minimum contents of 2.5% by weight, preferably at least 3% by weight, are necessary overall to produce nuclei in high density during the nucleation so that transparent glass ceramics can be produced after the high-quartz mixed crystals grow. By the high nuclear density, the mean crystallite size of the high-quartz mixed crystals remains limited to values of <100 nm, by which a disruptive light scattering is avoided. Higher nucleating agent contents than 5% by weight result, however, under the time/temperature conditions of the floating even in disruptive surface crystals in contact between glass and tin bath. A nucleating agent content of at most 4.5% by weight is preferred. In any case, a minimum content of $TiO_2$ of 1% by weight is necessary for an effective nucleation. The $TiO_2$ content is to be at most 3.0% by weight, preferably up to 2.6% by weight, since this component is involved in the formation of the Fe/Ti and Sn/Ti color complexes that are disruptive for the inherent colors. The contents of Nd are necessary to achieve the purpose according to the invention of a reduction of the inherent colors of the floated flat glasses and the transparent glass ceramics that are produced therefrom by staining. In addition, they are used to label clearly the flat glasses according to the invention and the glass ceramics that are produced therefrom and to improve the recycling capability. Additions of Co allow the color site to be placed more precisely in the vicinity of the achromatic point.

The production of disruptive surface defects during floating of LAS glasses is avoided in a way that is known in the art by the limiting of the contents of Pt to less than 300 ppb, Rh to less than 30 ppb, and ZnO to less than 1.5% by weight, as well as $SnO_2$ to less than 1% by weight. If the glass contains more than 300 ppb of Pt or more than 30 ppb of Rh in dissolved form, metallic excretions of Pt or Rh particles can be formed by the reducing conditions of the float atmosphere near the glass surface. The latter act as nuclei for large to up to 150 μm high-quartz mixed crystals and thus produce a disruptive surface crystallization. These noble metals, which are used in float units, in particular as electrodes, lining, stirrers, transport pipes, slide valves, etc., in the melt or float part are therefore avoided to a great extent in units for producing the flat glass according to the invention and are replaced by ceramic materials, or the construction is designed such that the above-mentioned contents are not exceeded.

The ZnO content is limited to 1.5% by weight, preferably to at most 1% by weight. It has been shown that under the reducing conditions of the floating, the zinc is partially reduced in the surface of the glass and thus evaporated into the float atmosphere because of the higher vapor pressure of $Zn^{o}$ compared to the $Zn^{2+}$. In addition to the evaporation that is undesirable for the operation of the float unit and the separation of the Zn at colder locations, the uneven distribution of the Zn in the floated flat glass is disadvantageous. The Zn is depleted on the top side of the floated flat glass, which is exposed to the float atmosphere, compared to the bottom side of the floated flat glass, which is in contact with the Sn bath. This unequal distribution of the Zn content results in different behaviors of the top and bottom sides of the floated flat glass, e.g., in the post-processing processes, such as coating and prestressing, and it is also disadvantageous during glazing. In interaction with other polyvalent glass components, the Zn can result in disruptive surface defects, such as, e.g., a crystal band. This crystal band is produced in interaction with the reducing influence of the float atmosphere on polyvalent glass components, here in particular the partial reduction of $Ti^{4+}$ to $Ti^{3+}$. Since both Zn and Ti are involved in the production of the crystal band, it has been shown that their contents preferably are to meet the condition in % by weight: $3.2 \times ZnO + TiO_2 \leq 4.3$. The ZnO content also intensifies the formation of pellets that consist of metallic Sn, or an Sn/Zn alloy in the glass on the float top side of the glass. It is therefore advisable to keep the starting value of the ZnO in the glass small from the outset.

The $SnO_2$ content in the glass is to be 0.1 to less than 1% by weight, preferably 0.2 to 0.6% by weight. $SnO_2$ is necessary for the refining of the comparatively high-melting glasses. The limitation of the $SnO_2$ content to less than 1% by weight helps to improve the devitrification resistance of the glass melts. Higher contents of $SnO_2$ can result in that in the area of the shaping, i.e., in viscosities in the processing temperature of the glass of $10^4$ dPas, undesirable Sn-containing crystal phases are produced. The upper devitrification limit (OEG) is preferably to be below the processing temperature $V_A$. Also, by higher $SnO_2$ contents, the corrosive attack of the glass melts on internals that consist of Pt or Pt/Rh is intensified and can increase their contents via the critical boundary values. Another glass defect caused by higher $SnO_2$ contents is the formation of pellets ("hole defects") that consist of metallic Sn in glass on the float top side, which is exposed to the reducing float atmosphere. These pellets are about 100 nm in size and can be partially removed during cooling or cleaning, but leave behind more spherical holes in the glass surface, which cause problems when the glass is put to use.

The glasses according to the invention are refined without using the refining agents arsenic oxide and/or antimony oxide that are common for glasses from the $Li_2O$—$Al_2O_3$—$SiO_2$ system and are thus technically free of these components that are disadvantageous under safety and environmental protection aspects. If these components should be present as contaminants, their content has to be limited to less than about 400 ppm. At higher contents, the above-mentioned refining agents are reduced under the action of the reducing conditions during floating, namely directly below the surface, and form disruptive and visually obvious deposits. The removal of the latter for the use of disruptive and toxicologically harmful deposits by grinding and polishing is disadvantageous for economic reasons.

In addition to the tin compounds that are used for refining, in addition still other chemical refining agents, such as sulfate, chloride and fluoride compounds, can be used if necessary.

In the case of especially high requirements of the bubble quality, it may be necessary to combine chemical refining and physical refining processes. The combination of the refining agent $SnO_2$ with a high-temperature refining <1700° C. has proven especially advantageous to achieve low numbers of bubbles of less than 10 bubbles/kg of glass (relative to the bubble sizes above 0.1 mm) with comparatively low $SnO_2$ contents. This holds true since $SnO_2$ cleaves the oxygen that is required for refining at comparatively high temperatures.

A glass or a glass composition that essentially has the composition below (in % by weight based on oxide) is especially suitable:

$SiO_2$ 60-68, $Al_2O_3$ 19-24, $Li_2O$ 3.5-4.5, $Na_2O$ 0.2-1, $K_2O$ 0-0.8, $\Sigma Na_2O+K_2O$ 0.4-1.5, MgO 0.1-2, CaO 0-1.5, in particular 0-1, SrO 0-1.5, in particular 0-1, BaO 0-2.5, ZnO 0-1, $TiO_2$ 1-2.6, $ZrO_2$ 1.2-2.2, $SnO_2$ 0.2-0.6, $\Sigma TiO_2+ZrO_2+SnO_2$ 3-4.5, $P_2O_5$ 0-2, $B_2O_3$ 0-2, in particular 0-1 $Nd_2O_3$ 0.025-0.46, CoO 0-0.003.

The water content of the glasses according to the invention depends on the selection of the raw materials of the batch and on the process conditions in the melt, usually between 0.015 and 0.06 mol/l. This corresponds to $\beta_{OH}$ values of 0.16 to 0.64 $mm^{-1}$.

The glass can also be prestressed chemically based on its $Li_2O$ content. In this case, it is advantageous if the content of $Li_2O+Na_2O$ is more than 3.7% by weight, since then very high compressive stresses in the glass surface can be produced by ion exchange with $Na_2O$ and/or $K_2O$.

For applications of the floated lithium-aluminosilicate flat glass, in which a high light transmission is desired, it is advantageous to limit the content of $Fe_2O_3$ to less than 250 ppm, the $TiO_2$ content to 2.3% by weight, the content of $Nd_2O_3$ to 4000 ppm and the CoO content to less than 30 ppm.

With these limitations, a low inherent color in the vitreous state at a thickness of 4 mm and with a variegation of colors (chromaticity) in the CIELAB system (or, in short, Lab system) C* of <3 can be achieved in connection with a light transmission of >85%. For most cases, an $Nd_2O_3$ content of 100 to 3000 ppm, in particular 100-2000 ppm, is sufficient and is preferred.

The environmental problem that exists for the chemical refining agents arsenic oxide and/or antimony oxide holds true, although to a smaller extent, in the barium oxide. Barium-containing raw materials, in particular if they are water-soluble, such as barium chloride and barium nitrate, are toxic and require special precautions during use. In the floated lithium-aluminosilicate flat glasses according to the invention, it is therefore advantageous to eliminate the addition of BaO except for technically unavoidable traces.

The floated flat glass according to the invention is typically characterized by a thermal expansion coefficient $\alpha_{20/300}$ between 3.5 and $5.5 \cdot 10^{-6}$/K. This is advantageous for the thermal prestressability. If the thermal expansion coefficient is below $3.5 \cdot 10$-6/K, it is difficult, with conventional air-prestressing units, to achieve a compressive stress that is sufficient for shattering according to DIN 1249. To achieve a high temperature difference resistance, the thermal expansion coefficient $\alpha_{20/300}$ is to be no more than $5.5 \cdot 10^{-6}$ /K. The transformation temperature Tg of the flat glass is to be between 600 and 750° C. Those transformation temperatures that are high in comparison to common lime-sodium glasses and also borosilicate glasses are advantageous for achieving a high compressive prestressing and thus a high temperature difference resistance. The transformation temperature is not to exceed 750° C., since otherwise technically significantly more expensive air prestressing units are required. In addition, the danger exists that the fire protection glazing is destroyed in the case of fire by the buckling steel frames, since the glass is not yet soft enough for the reduction of thermal stress. The processing temperature $V_A$ is below 1350° C. to promote the meltability of the glass and to limit the thermal stress of the float bath and the evaporation of glass components at high temperatures.

After conversion into the transparent, colorless glass ceramic with high-quartz mixed crystals as the main crystal phase, the thermal expansion coefficient $\alpha_{20/700}$ is to deviate no more than $0.5 \cdot 10^{-6}$/K from the zero expansion. The deviation is preferably to be less than $0.3 \cdot 10^{-6}$/K. With the low thermal expansion coefficients, a high temperature resistance and temperature difference resistance of the glass ceramic is achieved.

By the addition of $Nd_2O_3$ and optionally CoO, a slight inherent color can be achieved with a yellowness index of less than 15% and a variegation of colors C* of less than 10, measured in transmission at a thickness of 4 mm. The measurement of the yellowness index takes place in standard illuminant C, 2° according to the ASTM Standard 19257/70 (77, 85). The variegation of colors (chromaticity) in the lab system C* is defined by $C* = \sqrt{a*^3 + b*^2}$ whereby a* and b* are the color coordinates in this system. The color coordinates L*, a*, b* from the CIELAB system (or, in short, lab system) can be converted in a known way into color coordinates of other color systems, e.g., in the CIE system with color coordinates x y and brightness Y.

The additions of Nd and optionally Co are preferably selected such that the inherent color, measured at a thickness of 4 mm, reaches a yellowness index of <10% and a variegation of colors C* of less than 7.

The principle of the staining over an existing undesirable color tap with a staining agent with complementary absorption bands results, of course, in a stronger absorption of the light and thus reduces the light transmission. For reaching high light transmission, it is desirable to minimize the inherent color that is produced by Fe, Ti or Sn ions, so that small concentrations of staining agent are sufficient.

For applications of colorless, transparent glass ceramics, e.g., for use as fireplace door windows or as fire protection glazing, the contents are to be $TiO_2$<2.3% by weight, $SnO_2$<0.5% by weight, $Fe_2O_3$<200 ppm, $Nd_2O_3$>4000 ppm, and Co<30 ppm, so that at a thickness of 4 mm, a light transmission of >80% can be achieved, associated with a yellowness index of less than 15% and a variegation of colors C* of less than 10.

With conversion into the glass ceramic with keatite-mixed crystals as a main crystal phase, the thermal expansion coefficient $\alpha_{20/700}$ is to be less than $1.5 \cdot 10^{-6}$ K. Such glass ceramics can be present in transparent, white-translucent or white-opaque form depending on composition. When using colored oxides, the white shade is correspondingly stained over.

If a coating of the flat glass is desired, it is economically advantageous to use the residual heat of the glass from the shaping process and to perform this coating in the float part and/or in the annealing furnace before the glass cools. In this way, one or more layers that consist of, e.g., $SiO_2$, $TiO_2$, $SnO_2$, $Al_2O_3$, $WO_3$, $VO_2$ or conductive indium/tin oxide layers can be applied.

After thermal or chemical prestressing, the floated flat glass according to the invention is preferably used as safety glass, as fire protection glazing or as door windows in applications with high requirements on the temperature resistance, which are not achieved by lime-sodium glasses or by borosilicate glasses. As prestressed fire protection glass, the safety glass has properties according to DIN 1249 (shattering).

After conversion into a glass ceramic with high-quartz mixed crystals or keatite-mixed crystals, the latter are preferably used in transparent, colorless form as fire protection glass, fireplace door windows, oven door windows, in particular for a pyrolysis oven, covers for high-power lights. By applying a light-absorbing bottom coating, a cooking surface with the required light transmission can be produced from the transparent glass ceramic. After conversion into a glass ceramic with keatite-mixed crystals as a main crystal phase, the glass ceramic according to the invention in translucent or opaque form is preferably used as a cooking surface or as a cover panel in microwave ovens. Also, panes or glazings, e.g., in the fire protection area, through which no observation is to be allowed, can be used advantageously with this glass ceramic.

Aesthetic advantages are produced in the floated flat glasses and the glass ceramics that are produced therefrom by the high surface quality of the float process. Disruptive light reflections when viewed from above and distortion when looking through are avoided. The use, e.g., as transparent, colorless glass ceramic for the fire protection glazing is possible without an expensive polishing of the surface having to take place. This advantage is at work in particular when used as a door window in the various applications. With use as, e.g., a fireplace door window, oven door or in the lighting sector, as well as in glazings, the float surface is considerably less prone to the adhesion of grime and is easier to clean than, e.g., a surface that is produced via roller shaping with its microroughness. Also, flat glasses with larger dimensions than, e.g., the roller process are available to the float process, since the glass band width during floating can be about 2-5 m.

In addition to a suppression of the brown-yellow staining by the Sn/Ti or Fe/Ti complex, the advantages that can be achieved with the invention lie primarily in the possibility of being able to easily detect cullets with the claimed composition.

In preparation processes during recycling, the characteristic absorption lines of the Nd make possible a detection and separation of old cullets from lime-sodium glass. The addition of Nd for labeling is especially advantageous because of the characteristic absorption lines and its property of fluorescing in infra-red. Another advantage of the Nd consists in that the absorption lines hardly shift even during glazing of the glass.

By the above-mentioned properties, it is possible to keep cullets—originating from (prestressed) flat glass or transparent glass ceramics that, because of their low inherent color, can be easily confused with, e.g., normal window panes from low-melting lime-sodium glass—from being incorporated into their preparation process and remelted.

In addition, the content of Nd can be detected very easily with commercially available spectrometers. This makes it easy for the manufacturer of the original product to recognize his product and simplifies the clear assignment of product liability in the event of damage or loss. Differentiation of transparent glass ceramics of various manufacturers is only possible via expensive analytical measuring methods, as they are available only in a few special laboratories. They can be omitted, e.g., if the examined product does not contain any Nd.

The invention is further illustrated based on Examples 1 to 21. Examples 1 to 18 are combined in table form.

Table 1 contains the composition of 9 glasses; Glass 1 is a comparison example with a composition according to DE 100 17 701 C2.

Table 2 contains the physical data of the glasses from Table 1.

Table 3 shows the physical data of the glasses that are converted into glass ceramics with the compositions according to Table 1 as well as the conversion parameters.

The starting glasses of Table 1 were melted and refined with use of raw materials that are common in the glass industry. By the selection of raw materials, the $Fe_2O_3$ content of the test melts is approximately 70-160 ppm (Table 1). Glasses Nos. 2, 3 and 4 of Table 1 were melted in a high-frequency heated 4l crucible made of sintered silica glass at temperatures around 1750° C. After the batch was melted, it was refined for one hour at 1900 to 2000° C. Almost bubble-free castings were obtained by this high-temperature refining. The water content of Glasses 1-8 (Table 1) is approximately 0.041 mol/l corresponding to a $\beta_{OH}$ of about 0.45 mm. In Glass No. 9 with chloride-refining agent additive, experience shows that the water content is less than 0.034 mol/l corresponding to a $\beta_{OH}$ of about 0.37 mm$^{-1}$.

From these castings, tests were prepared for pouring out into a commercial float unit for the floating of special glasses. In this case, the castings were melted again in a 2l crucible made of Pt/Rh with a silica glass inner crucible. These crucibles were fastened with a long rod to the front end of a holding apparatus. The holding apparatus with the crucible was inserted into the float unit via small openings. The melt that is found in the crucible was poured onto the liquid tin at the beginning of the float unit behind the spout-lip and, during the smoothing flow, was attached to the production line that consists of borosilicate glass. The dwell time of the poured-out glass on the float bath was about 30 to 40 minutes. Together with the production line that consists of borosilicate glass, the test melts were transported through the test unit and through the annealing furnace. Behind the annealing furnace, the solidified test melts could be cut out from the production line with a thickness of about 4 to 6 mm and removed for studies. Owing to the very similar expansion coefficients of borosilicate glass and the compositions according to the invention, the test melts also adhered very readily during cooling without the stresses caused by the different expansion coefficients causing the test melts to break away from the production line in the annealing furnace.

By avoiding the Pt/Rh contact in the glass melts, the Pt content is 10-30 ppb; the Rh content lies below the detection limit 10 ppb. From the floated test melts, the test patterns, e.g., rods for measuring the thermal expansion coefficients, as well as plates for transmission measurements were prepared outside. Further, the floated test melts were examined on the top and bottom for glass defects, in particular crystals. The top of the floated test melts are free of crystals. Only in rare cases, when substances from the cover or from the side of the float bath, such as, e.g., fiber materials or condensates, occur on the glass melts, can crystals be formed in contact. On the bottom of the floated test melts, there are isolated but visually non-disruptive crystals. The development of these crystals is attributed to the introduction of small amounts of atmospheric oxygen in the float bath in the case of test-related openings of the float unit. The atmospheric oxygen that is introduced under test conditions can oxidize the Sn locally, by which it then diffuses into the glass and acts as a nucleating agent, which produces local high-quartz mixed crystals. The prestressability of the glass and the conversion into the glass ceramic as well as the associated determinations of use are not adversely affected by the isolated bottom crystals.

Excretions of Pt and in particular Rh with the associated glass defects, such as, e.g., the very harmful crystal bands, are not found in the test melts with the glasses according to the invention. Also, Sn drops on the top of the floated test melts do not occur. By the additions of Nd according to the invention, no associated glass defects on the top and bottom occur in the floated test melts with the glasses according to the invention. Also, known glass defects, which are associated with other glass components, are not intensified by the additions. Thus, it is evident that the additions according to the invention are also suitable for the production of glasses according to the float process. In the conversion into the glass ceramics according to the invention, no defects that are disruptive for the properties or the post-processing process are observed.

The residual glasses 5 to 9 according to the invention and the comparison glass 1 from Table 1 were melted and refined at conventional temperatures of about 1620° C. Glass 9 was melted with an $SnO_2$/Cl mixed refining. In the weighing-in of the batch, 0.53% by weight of Cl was used as $BaCl_2$. According to analysis, 0.1% by weight of Cl remains in the glass composition obtained as a substitute for O. After melting in crucibles made of sintered silica glass, the melts were poured into the Pt/Rh crucible with an inside crucible made of silica glass and homogenized at temperatures of 1560° C. for 30 minutes while being stirred. After standing at 1640° C. for 2 hours, castings of about 140×100×30 mm in size were poured and cooled in an annealing furnace, beginning from about 670° C. to room temperature. The test patterns for measuring the properties in the vitreous state and the patterns for the glazing were prepared outside from the castings. Transmission measurements were performed on plates with a thickness of 4 mm. The glasses according to the invention and the glasses and glass ceramics produced therefrom substantiate the advantageous action of the use of Nd and optionally additional Co for reducing the disruptive inherent colors (Tables 2 and 3).

Figure 1:
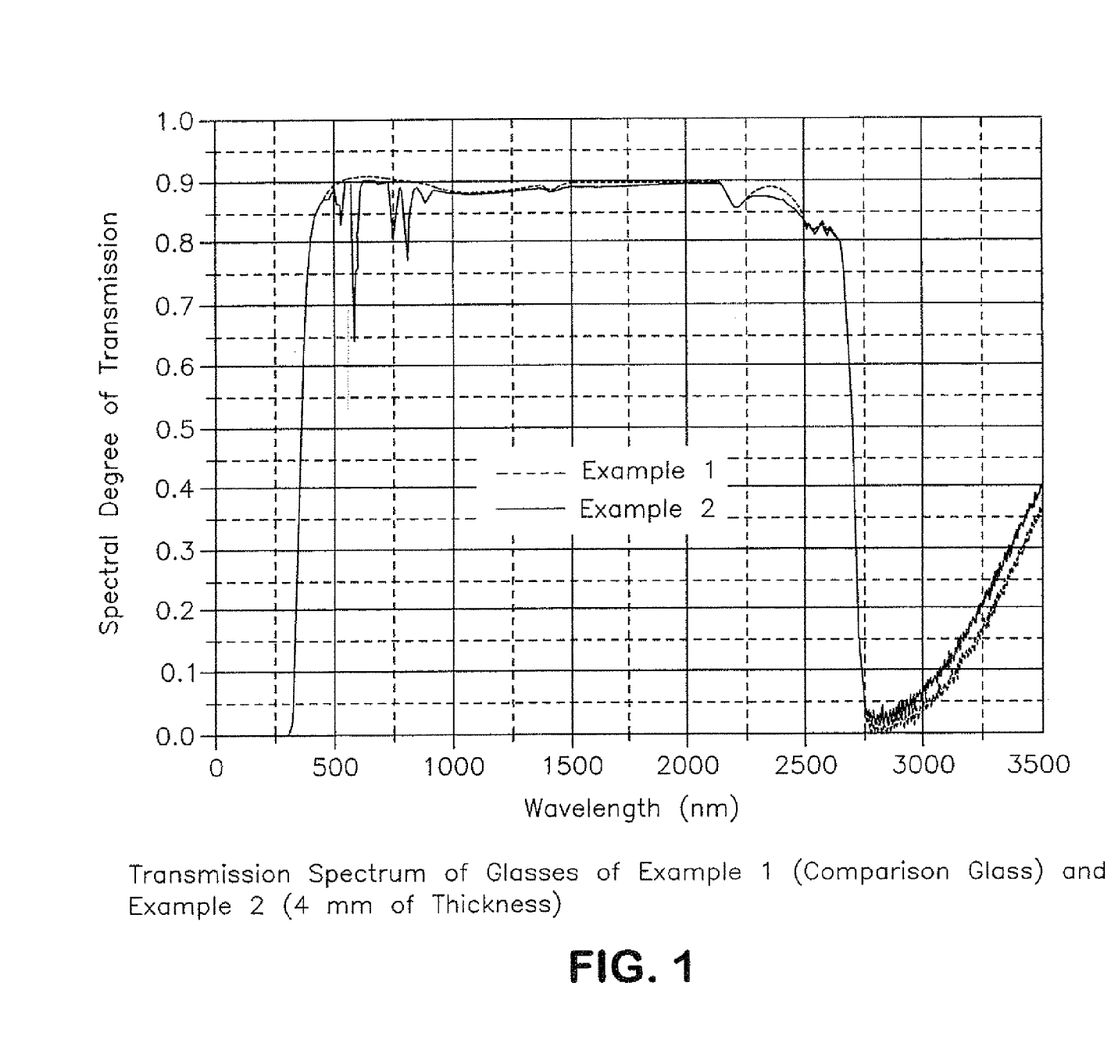
FIGS. 1 and 2 show spectral Transmission curves for comparison glasses and glasses of the invention.

Example 20 shows the transmission spectra of the starting glasses (Examples 1, 2) for a thickness of 4 mm. In this connection, in Example 2 according to the invention, the characteristic absorption bands of the Nd ion, which are extremely well suited for labeling and for recycling the floated flat glasses according to the invention, can be detected.

Figure 2:
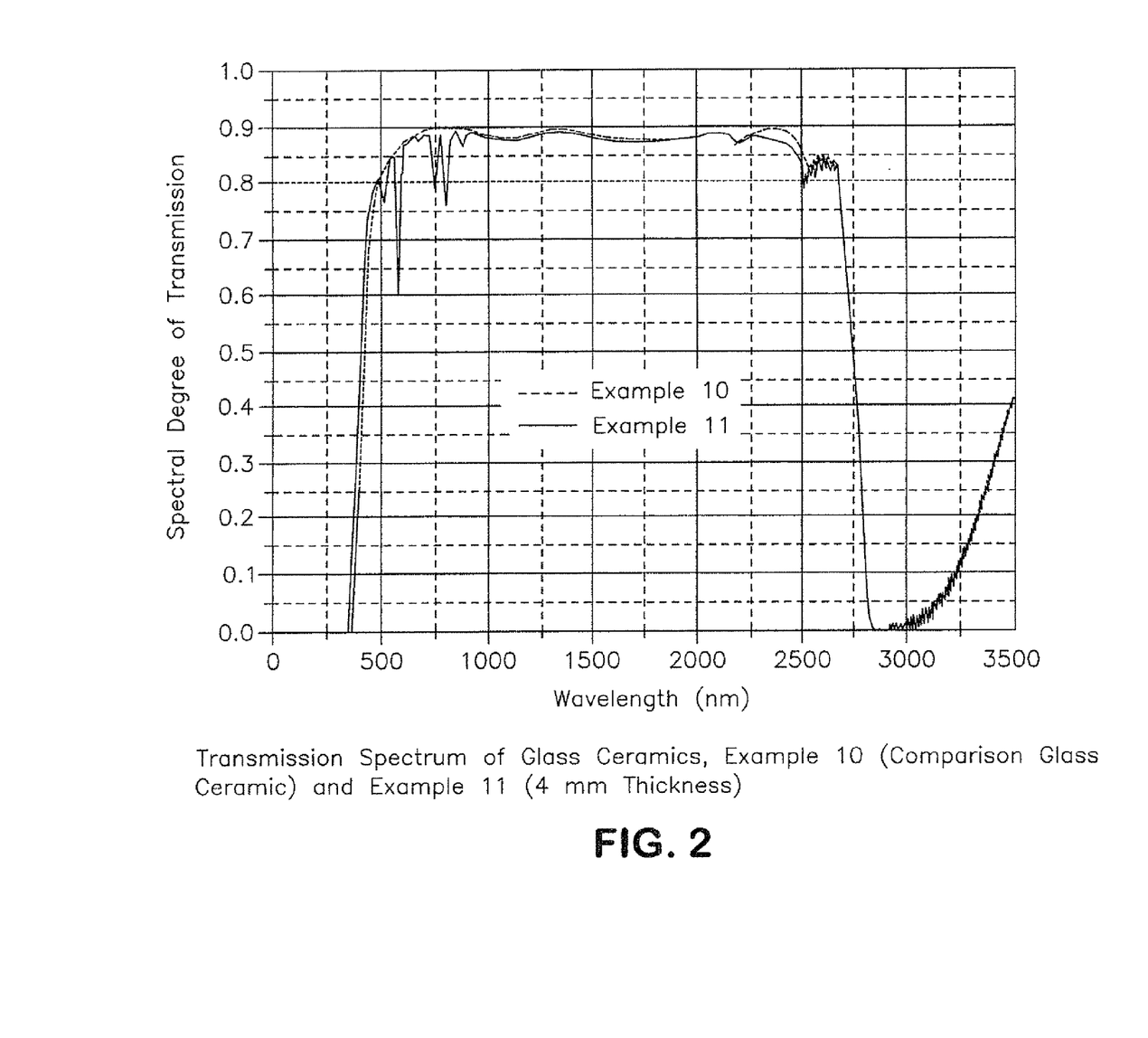

Also, the comparison glass 1 corresponds to the requirements that are set relative to the floatability. After the glazing in a transparent glass ceramic with high-quartz-mixed crystals as a main crystal phase, the comparison example 10 (Table 3) shows, however, a very disruptive yellow coloring with a yellowness index of 21.7%. This staining is attributed in particular to the Sn/Ti color complex. Example 21 shows the related transmission spectrum of a 4 mm thick sample. In the case of Glass No. 2 in Table 1, a staining over with the addition of 0.28% by weight of $Nd_2O_3$ according to the invention is performed. After glazing in the colorless, transparent glass ceramic according to the invention (Example 11), the disruptive staining has disappeared, and a natural gray shade of the glass occurs, which is not so obvious and disruptive by any means. The transmission spectrum is also visible in Example 21. The characteristic absorption bands of the Nd ion, which are suitable for labeling and for recycling the glass ceramics, are shown.

Glass No. 8 from Table 1 was measured relative to its devitrification behavior. In the measurement of the upper devitrification limits (OEG), the glass was melted in Pt/Rh crucibles. Then, the crucible was kept for 5 hours at various temperatures in the range of the processing temperature. The highest temperature at which the first crystals in contact with platinum/rhodium or in volumes occur determines the OEG. As desired, the upper devitrification limit at 1280° C. is below the processing temperature $V_A$ (1308° C.) of the glass. With the devitrification temperature OEG, mullite and baddeleyite occur as crystal phases.

The conversion into the transparent glass ceramic was carried out at the nucleation and crystallization temperatures cited in Table 3. After quick heating to 600° C., the heating to the nucleation temperature at a heating rate of 4 K/minute and the additional increase of the nucleation temperature to the crystallization temperature at a heating rate of 2.5 K/minute are performed. The cooling from the maximum temperature was carried out up to 600° C. at a cooling rate of about 4 K/minute, then by shutting off the oven heating. Example 12 shows a glass ceramic, which was converted by a maximum temperature 1100° C. for 20 minutes into a white, translucent glass ceramic with keatite-mixed crystals as the prevailing crystal phase. The main crystal phase and its phase proportion in the glass ceramic were determined by means of x-ray diffraction diffractometry. The transmission measurements were performed with standard illuminant

EXAMPLE 19

Glass 2 from Table 1 was chemically prestressed by ion exchange in a salt bath that consists of sodium nitrate at 450° C. for 22 hours. The thickness of the compressive stress layer is 1 mm thick before the prestressing of polished samples is measured by photoelasticity. The measured surface compressive stress was 7900 nm/cm; the tensile stress is 100 nm/cm inside the glass. The thickness of the compressive stress zone on the surface is 320 μm. Good chemical prestressability is shown by the comparatively high values of the compressive stress and the excellent thicknesses of the compressive stress layer on the surface of the flat glasses according to the invention.

Example 20 shows a comparison of the transmission spectra of Glass 1 and Glass 2.

Example 21 shows a comparison of the transmission spectra of the glass ceramic that is produced from Glass 1 and the glass ceramic that is produced from Glass 2.

TABLE 1

Compositions of Floated Glasses According to the Invention and Comparison Glass 1

| Composition (% by Weight) Based on Oxide: | Glass No. | | | | | | | | |
|---|---|---|---|---|---|---|---|---|---|
| | 1 | 2 | 3 | 4 | 5 | 6 | 7 | 8 | 9 |
| $Li_2O$ | 4.07 | 4.10 | 4.03 | 4.00 | 4.09 | 4.09 | 4.09 | 4.10 | 3.81 |
| $Na_2O$ | 0.56 | 0.56 | 2.00 | 0.30 | 0.57 | 0.57 | 0.57 | 0.57 | 0.35 |
| $K_2O$ | 0.22 | 0.22 | 0.22 | | 0.22 | 0.22 | 0.22 | 0.22 | |
| $\Sigma Na_2O + K_2O$ | 0.78 | 0.78 | 2.22 | 0.30 | 0.79 | 0.79 | 0.79 | 0.79 | 0.33 |
| MgO | 1.18 | 1.19 | 1.17 | 1.02 | 1.19 | 1.19 | 1.19 | 1.20 | 0.87 |
| CaO | | | | | | | | | 0.22 |
| SrO | | | | | | | | | 0.3 |
| BaO | | | | | | | | | 1.55 |
| ZnO | 1.00 | | 0.30 | 0.46 | 0.30 | 0.30 | 0.30 | 0.30 | 0 |
| $Al_2O_3$ | 22.69 | 22.85 | 22.45 | 22.61 | 22.83 | 22.80 | 22.78 | 22.85 | 22.5 |
| $SiO_2$ | 64.50 | 64.96 | 63.82 | 66.13 | 64.89 | 64.82 | 64.74 | 64.95 | 65.9 |
| $TiO_2$ | 2.14 | 2.16 | 2.12 | 1.50 | 2.15 | 2.15 | 2.15 | 2.15 | 2.05 |
| $ZrO_2$ | 1.89 | 1.90 | 1.86 | 1.96 | 1.90 | 1.90 | 1.90 | 1.90 | 2.0 |
| $SnO_2$ | 0.45 | 0.45 | 0.44 | 0.44 | 0.45 | 0.45 | 0.45 | 0.25 | 0.20 |
| $\Sigma TiO_2 + ZrO_2 + SnO_2$ | 4.48 | 4.51 | 4.42 | 3.90 | 4.50 | 4.50 | 4.50 | 4.30 | 4.25 |
| $P_2O_5$ | 1.30 | 1.31 | 1.29 | 1.33 | 1.31 | 1.31 | 1.31 | 1.31 | 0 |
| $Nd_2O_3$ | | 0.30 | 0.30 | 0.25 | 0.10 | 0.20 | 0.30 | 0.20 | 0.15 |
| CoO | | | | | | | | 0.0012 | 0.0011 |
| $Fe_2O_3$ (ppm) | — | — | 160 | 70 | 160 | 160 | 160 | 150 | 90 |

TABLE 2

Properties of Floated Glasses According to the Invention and Comparison Glass 1

| | Example No. | | | | | | | | |
|---|---|---|---|---|---|---|---|---|---|
| | 1 | 2 | 3 | 4 | 5 | 6 | 7 | 8 | 9 |
| Vitreous | Glass No. | | | | | | | | |
| Properties: | 1 | 2 | 3 | 4 | 5 | 6 | 7 | 8 | 9 |
| Tg (° C.) | 682 | 694 | 671 | 707 | 691 | 689 | 690 | 689 | 710 |
| VA (° C.) | 1299 | 1299 | 1297 | 1333 | 1303 | 1301 | 1305 | 1308 | 1314 |
| α20/300 ($10^{-6}$/K) | 4.17 | 4.17 | 4.83 | 3.91 | 4.19 | 4.18 | 4.13 | 4.18 | 4.09 |
| Transmission at a 4 mm Thickness Standard Illuminant C, 2° | | | | | | | | | |
| Total Light Transmission Y [%] | 90.4 | 84.8 | 85.0 | 86.1 | 88.9 | 86.9 | 85.3 | 86.0 | 86.9 |
| Color Site CIE System | | | | | | | | | |
| x | 0.3128 | 0.3068 | 0.3072 | 0.3060 | 0.3106 | 0.3087 | 0.3068 | 0.3074 | 0.3074 |
| y | 0.3202 | 0.3136 | 0.3143 | 0.3121 | 0.3177 | 0.3157 | 0.3136 | 0.3142 | 0.3138 |
| Color Site Lab System | | | | | | | | | |
| L* | 96.0 | 93.7 | 93.8 | 94.4 | 95.4 | 94.6 | 93.9 | 94.2 | 94.7 |
| a* | −0.6 | −0.4 | −0.5 | 0 | −0.5 | −0.5 | −0.4 | −0.4 | −0.2 |

TABLE 2-continued

Properties of Floated Glasses According to the Invention and Comparison Glass 1

| Vitreous Properties: | Example No. | | | | | | | | |
|---|---|---|---|---|---|---|---|---|---|
| | 1 | 2 | 3 | 4 | 5 | 6 | 7 | 8 | 9 |
| | Glass No. | | | | | | | | |
| | 1 | 2 | 3 | 4 | 5 | 6 | 7 | 8 | 9 |
| b* | 2.0 | −1.5 | −1.2 | −2.2 | 0.7 | −0.4 | −1.5 | −1.2 | −1.3 |
| Variegation of Colors c* | 2.1 | 1.6 | 1.3 | 2.2 | 0.9 | 0.6 | 1.6 | 1.2 | 1.4 |

TABLE 3

Conversion Conditions and Properties of the Glass Ceramics that are Converted from the Glasses According to Table 1 (Glass 1 = Comparison Glass)

| Conversion Conditions: | Example No. | | | | | | | | |
|---|---|---|---|---|---|---|---|---|---|
| | 10 | 11 | 12 | 13 | 14 | 15 | 16 | 17 | 18 |
| | Glass No. | | | | | | | | |
| | 1 | 2 | 3 | 4 | 5 | 6 | 7 | 8 | 9 |
| Nucleation | | | | | | | | | |
| T (° C.) | 740 | 740 | 755 | 740 | 740 | 740 | 740 | 740 | 740 |
| t (min) | 60 | 60 | 60 | 60 | 60 | 60 | 60 | 60 | 60 |
| Crystallization | | | | | | | | | |
| T (° C.) | 900 | 900 | | 900 | 900 | 900 | 900 | 900 | 900 |
| t (min) | 15 | 15 | | 15 | 15 | 15 | 15 | 15 | 15 |
| Conversion into Keatite | | | | | | | | | |
| T (° C.) | | | 1100 | | | | | | |
| t (min) | | | 7 | | | | | | |
| Properties: | | | | | | | | | |
| Main Crystal Phase | HQ | HQ | KMK | HQ | HQ | HQ | HQ | HQ | HQ |
| Phase Proportion (% by Weight) | 77 | 72 | 91 | 77 | 72 | 73 | 72 | 73 | 71 |
| $\alpha 20/700$-$10^{-6}$/k | 0.12 | 0.27 | 1.43 | −0.35 | 0.23 | 0.22 | 0.25 | 0.20 | 0.19 |
| IR Transmission 1600 nm (%) | 87.8 | 82.5 | 82.5 | 89.4 | 88.6 | 88.2 | 88.1 | 87.7 | 88.9 |
| Transmission at a Thickness of 4 mm Standard Illuminant C, 2° | | | | | | | | | |
| Total Light Transmission Y % | 84.2 | 79.1 | 3.9 | 82.3 | 83.9 | 81.5 | 80.3 | 79.6 | 81.9 |
| Color Site | | | | | | | | | |
| x | 0.3290 | 0.3164 | | 0.3146 | 0.3202 | 0.3183 | 0.3155 | 0.3151 | 0.3118 |
| y | 0.3442 | 0.3272 | | 0.3245 | 0.3310 | 0.3291 | 0.3257 | 0.3208 | 0.3160 |
| L* | 92.6 | 90.8 | | 92.3 | 92.9 | 91.9 | 91.4 | 91.5 | 92.8 |
| a* | −4.0 | −2.1 | | −1.8 | −2.1 | −2.1 | −1.9 | 0.2 | 1.0 |
| b* | 13.3 | 5.0 | | 3.8 | 7.1 | 6.0 | 4.3 | 2.5 | 0.2 |
| Variegation of Colors c* | 13.9 | 5.4 | | 4.2 | 7.4 | 6.4 | 4.7 | 2.5 | 1.0 |

TABLE 3-continued

Conversion Conditions and Properties of the Glass Ceramics that are Converted
from the Glasses According to Table 1 (Glass 1 = Comparison Glass)

| | Example No. | | | | | | | | |
|---|---|---|---|---|---|---|---|---|---|
| | 10 | 11 | 12 | 13 | 14 | 15 | 16 | 17 | 18 |
| Conversion | | | | | Glass No. | | | | |
| Conditions: | 1 | 2 | 3 | 4 | 5 | 6 | 7 | 8 | 9 |
| Yellowness Index % | 21.7 | 8.3 | | 6.2 | 12.2 | 10.3 | 7.2 | 5.4 | 1.4 |

Crystal Phases:
HQ = High-Quartz Mixed Crystal
KMK = Keatite-Mixed Crystal

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 06 005 594.4, filed Mar. 20, 2006, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for preparing a glass ceramic converted from an optically detectable, floatable arsenic- and antimony-free, glazable lithium-aluminosilicate glass that can be pre-stressed,
   comprising preparing a composition which preparation includes the addition of 0.01-0.6% by weight of $Nd_2O_3$ based on oxide resulting in a composition as follows in % by weight based on oxide:

| | |
|---|---|
| $SiO_2$ | 55-69 |
| $Al_2O_3$ | 19-25 |
| $Li_2O$ | 3.2-5 |
| $Na_2O$ | 0-1.5 |
| $K_2O$ | 0-1.5 |
| MgO | 0-2.2 |
| CaO | 0-2.0 |
| SrO | 0-2.0 |
| BaO | 0-2.5 |
| ZnO | 0-<1.5 |
| $TiO_2$ | 1-3 |
| $ZrO_2$ | 1-2.5 |
| $SnO_2$ | 0.1-<1 |
| $\Sigma TiO_2 + ZrO_2 + SnO_2$ | 2.5-5 |
| $P_2O_5$ | 0-3 |
| CoO | 0.0011-0.005 |
| F | 0-1 |
| $B_2O_3$ | 0-2. | and ceramizing.

2. A method according to claim 1, wherein in the composition the sum of $Na_2O+K_2O$ is 0.1-2% by weight.

3. A method according to claim 1, wherein in the composition the sum of $3.2 \times ZnO + TiO_2$ is a maximum of 4.3% by weight.

4. A method according to claim 1 with a composition of essentially (in % by weight based on oxide):

| | |
|---|---|
| $SiO_2$ | 60-68 |
| $Al_2O_3$ | 19-24 |
| $Li_2O$ | 3.5-4.5 |
| $Na_2O$ | 0.2-1 |
| $K_2O$ | 0-0.8 |
| $\Sigma Na_2O + K_2O$ | 0.4-1.5 |
| MgO | 0.1-2 |
| CaO | 0-1 |
| SrO | 0-1 |
| BaO | 0-2.5 |
| ZnO | 0-1 |
| $TiO_2$ | 1-2.6 |
| $ZrO_2$ | 1.2-2.2 |
| $SnO_2$ | 0.2-0.6 |
| $\Sigma TiO_2 + ZrO_2 + SnO_2$ | 3-4.5 |
| $P_2O_5$ | 0-2 |
| $Nd_2O_3$ | 0.025-0.46 |
| CoO | 0.0011. |

5. A method according to claim 1, wherein in the composition the sum of $Li_2O+Na_2O$ is at least 3.7.

6. A method according to claim 1, wherein the composition contains
   less than 2.3 $TiO_2$
   less than 0.4 $Nd_2O_3$
   less than 0.003 CoO
   and, as a contaminant, less than 0.025 $Fe_2O_3$.

7. A method according to claim 1, wherein the glass ceramic is free of BaO.

8. A method according to claim 1, wherein the glass ceramic has a content of less than 300 ppb of Pt and less than 30 ppb of Rh.

9. A method according to claim 1, wherein the glass ceramic has a content of 100 to 3000 ppm of $Nd_2O_3$.

* * * * *